(12) United States Patent
Ridolfi et al.

(10) Patent No.: US 7,390,018 B2
(45) Date of Patent: Jun. 24, 2008

(54) STEERING WHEEL WITH NON-ROTATING AIRBAG

(75) Inventors: Roberto Ridolfi, Tregnago (IT); Valerio Poli, Villa Bartolomea (IT); Adolfo Ridolfi, Tregnago (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 352 days.

(21) Appl. No.: 11/226,587

(22) Filed: Sep. 15, 2005

(65) Prior Publication Data

US 2006/0220360 A1 Oct. 5, 2006

(30) Foreign Application Priority Data

Apr. 1, 2005 (EP) .................................. 05007147

(51) Int. Cl.
*B60R 21/16* (2006.01)
(52) U.S. Cl. ....................................................... 280/731
(58) Field of Classification Search ................. 280/731, 280/728.2, 93.512, 771; 74/431, 552
See application file for complete search history.

(56) References Cited

U.S. PATENT DOCUMENTS

| 4,541,301 | A | 9/1985 | Ono et al. |
| 5,558,365 | A | 9/1996 | Oe et al. |
| 2003/0067147 | A1 | 4/2003 | Holmes et al. |
| 2003/0164060 | A1 | 9/2003 | Menjak |

FOREIGN PATENT DOCUMENTS

| EP | 0 314 887 A1 | 8/1988 |
| ES | 2 185 465 A1 | 4/2003 |
| FR | 2 833 916 A1 | 6/2003 |

*Primary Examiner*—Faye M. Fleming
(74) *Attorney, Agent, or Firm*—Lonnie Drayer

(57) ABSTRACT

The present invention relates to a steering wheel having a stationary hub mounted portion. The steering wheel has an armature with a hub and is coupled to a vehicle steering shaft. The hub is provided with an opening through which a coiled element passes. A non-rotating housing is assembled with the hub. The coiled element connects the non-rotating housing to a stationary component of the vehicle. The coiled element screwing or unscrewing itself to or from the hub via the opening when the steering wheel is rotated.

20 Claims, 5 Drawing Sheets

STEERING WHEEL WITH NON-ROTATING
AIRBAG

FIELD OF THE INVENTION

The present invention relates to a steering wheel having a stationary hub mounted portion, in particular to a steering wheel having a non-rotating driver airbag module.

BACKGROUND OF THE INVENTION

A typical driver airbag module is mounted on a vehicle steering wheel usually fixed to a hub, which in turn is coupled to a steering shaft. Consequently a driver airbag rotates in unison with the steering wheel. Since the deployment of the airbag may occur at different rotational orientations of the steering wheel with respect to the vehicle driver, the driver airbag has to be circular or symmetrical shaped to provide always the same shape of protection surface to the driver.

In some motor vehicles, for instance sport cars, the maximum diameter of the airbag is limited by the high inclination of the windscreen and the front door jambs. Recently, steering wheel assemblies have been provided that allow the driver airbag module to remain in a stationary position with respect to the vehicle during rotation of the steering wheel. This type of module is known as a non-rotating, or static, driver airbag module. Advantageously, non-rotating driver airbags may provide airbags having shapes other than circular, since there is no rotation of the airbag with respect to the driver. Non-rotating driver airbag modules allow for localized increases of the airbag volume. Thus driver airbags may be designed to fit the internal volume of a particular vehicle when deployed to better protect the driver regardless of the angular orientation of the steering wheel.

DISCUSSION OF THE PRIOR ART

US 2003/0067147 A1 discloses a static driver airbag assembly that comprises a rotatable steering wheel encompassing an accessible space and coupled to the respective shaft by a planetary gear system. The planetary gear system transfers torque applied to the steering wheel ring portion directly to the steering shaft. An airbag module is positioned within the accessible space encompassed by the steering wheel and remains in a stationary position during rotation of the steering wheel.

Prior art assemblies provided with gears usually have a complicated structure that leads to high production costs and time-consuming mounting operations. Moreover, since gears typically rotate each around its own axis, it is necessary that the assembly gears have exact dimensions to avoid damping of the force transmitted by the driver to the steering shaft or the occurring of an offset between the rotation angle of the steering wheel ring portion and the rotation of the steering shaft. If one of the static driver airbag components has dimensions different from what is specified, a non-uniform rotation of the steering wheel ring portion may occur, for example due to the imperfect matching between the gears.

ES 2185465 discloses an assembly for stationary mounting an airbag module on a steering wheel that comprises a rotor portion fixed to the ring portion of a steering wheel and another component that is stationary with respect to the vehicle. The stationary component comprises two coaxial pulleys that support an airbag module and are coupled to two return pulleys of the rotor portion by belts.

U.S. Pat. No. 5,558,365 B discloses an assembly provided with main pulleys mounted in a stationary manner with respect to the steering shaft for supporting an airbag module and with a rotor portion coupled to the steering wheel ring portion. The rotor portion is interposed between the pulleys and is provided with two secondary pulleys. The main pulleys and the secondary pulleys are coupled by belts.

A drawback of such solutions is that a tensioning device has to be provided for the belts. Moreover the belts loose their mechanical properties in time as they undergo mechanical and thermal stresses.

US 2003/0164060 A1 discloses a steering wheel for a vehicle provided with a second shaft other than the steering shaft. The second shaft is supported via bearings by a stationary hub, which includes a driver airbag housing, such that it is rotatable about its own axis and is coupled to the steering shaft by an arm or an electronic actuator. The actuator includes a position sensor for detecting an angular displacement of the second shaft from a selected origin and producing a signal indicative of the angular displacement. Such a signal is transmitted to a road wheel actuator so that the position of the road wheels properly corresponds with the position of the steering wheel.

Generally, solutions based on a plurality of shafts are complicated and expensive. Duplication of the steering shaft facilitates passing the airbag module wiring harness easily inside the steering wheel column, but requires accurate design and assembly, expensive mechanical components and eventually electronic devices. Moreover, traditional assemblies provided with a plurality of gears or shafts are normally cumbersome. Consequently, vehicle steering columns, i.e. the various components of the vehicle around and comprising the steering shaft, have to be re-designed accordingly to accomodate such assemblies.

Therefore, there is a need for a reliable and compact driver airbag module assembly that does not rotate with the steering wheel and that can be fitted on existing steering columns without having to re-design the same.

SUMMARY OF THE INVENTION

The present invention provides a steering wheel having a stationary central portion which overcomes the drawbacks of known solutions, being at the same time economical, reliable and simple to manufacture and assemble.

A steering wheel according to the present invention has a stationary central portion that can be directly mounted on known steering columns with no need for re-designing of the same columns.

A steering wheel according to the present invention has a stationary central portion wherein the steering wheel can be directly connected to a steering shaft in a traditional way.

A steering wheel according to the present invention has a static, non-rotating driver airbag module which is adaptable to various needs in terms of dimensions, styling and cost requirements.

DETAILED DESCRIPTION OF THE INVENTION

Figure 1:
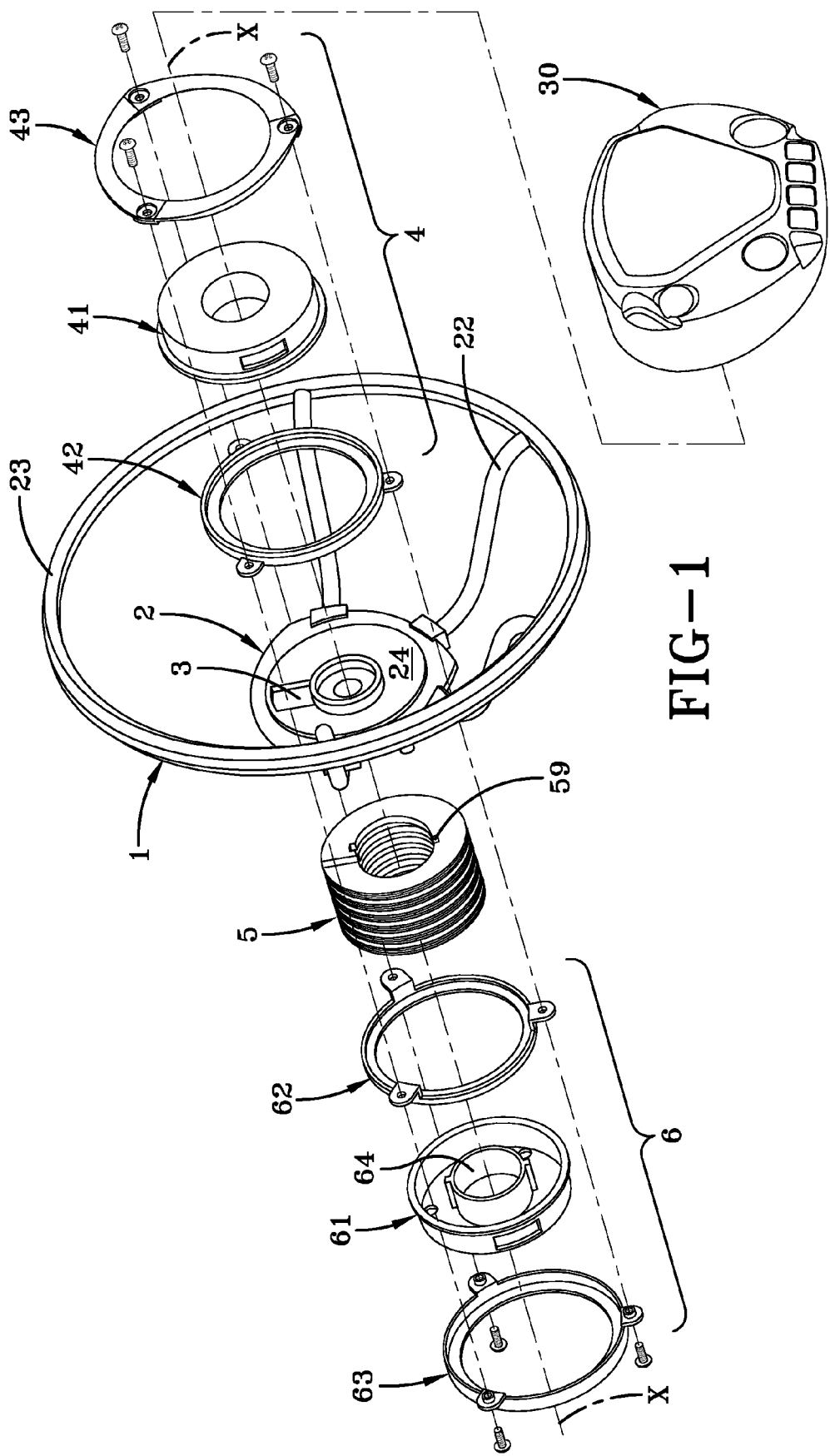
FIG. 1 is an exploded view of a steering wheel according to the present invention.

An exploded view of a steering wheel according to the present invention is shown in FIG. 1. The steering wheel comprises an armature 1 that may be of a traditional type having a hub 2, one or more spokes 22 and a rim 23. The hub 2 is fixable to a steering wheel shaft 7 (FIG. 2) along a common axis of rotation X-X. The hub is provided with a through opening 3 that connects a side 24 of the hub 2 that will be proximal with a vehicle driver with an opposite side 25 of the hub 2 that will be distal from a vehicle driver, i.e. the side proximal a vehicle steering column. In the embodiment shown in FIG. 1, the opening or aperture 3 is positioned on the hub 2 spaced radially apart from the axis of rotation X-X of the steering wheel. The hub can be directly fixed to a steering shaft in a traditional way, for instance by coupling the shaft to the centre of the hub. Thus the steering wheel according to the present invention does not need the vehicle steering column to be re-designed. Rotation of the coiled element around the axis of rotation of the steering wheel is substantially prevented. Consequently when the steering wheel is rotated, the hub rotates with respect to the coiled element and the opening runs on the coiled element, following its coils.

The steering wheel has a coiled element 5 comprising coils 53-56 that are intended to pass through the through opening 3 of the hub. The coils wind, or spiral, in a continuous curve around a longitudinal axis. The overall shape of the coiled element may cylindrical such that the coiled element has a helical-like structure, as the one shown in the figure. Alternatively, the coiled element may have other shapes, for instance having a longitudinal cross-sectional shape that is elliptical. The coiled element 5 is coaxial with the hub 2 and the steering shaft 7 along the axis of rotation X-X of the steering wheel.

Figure 2:
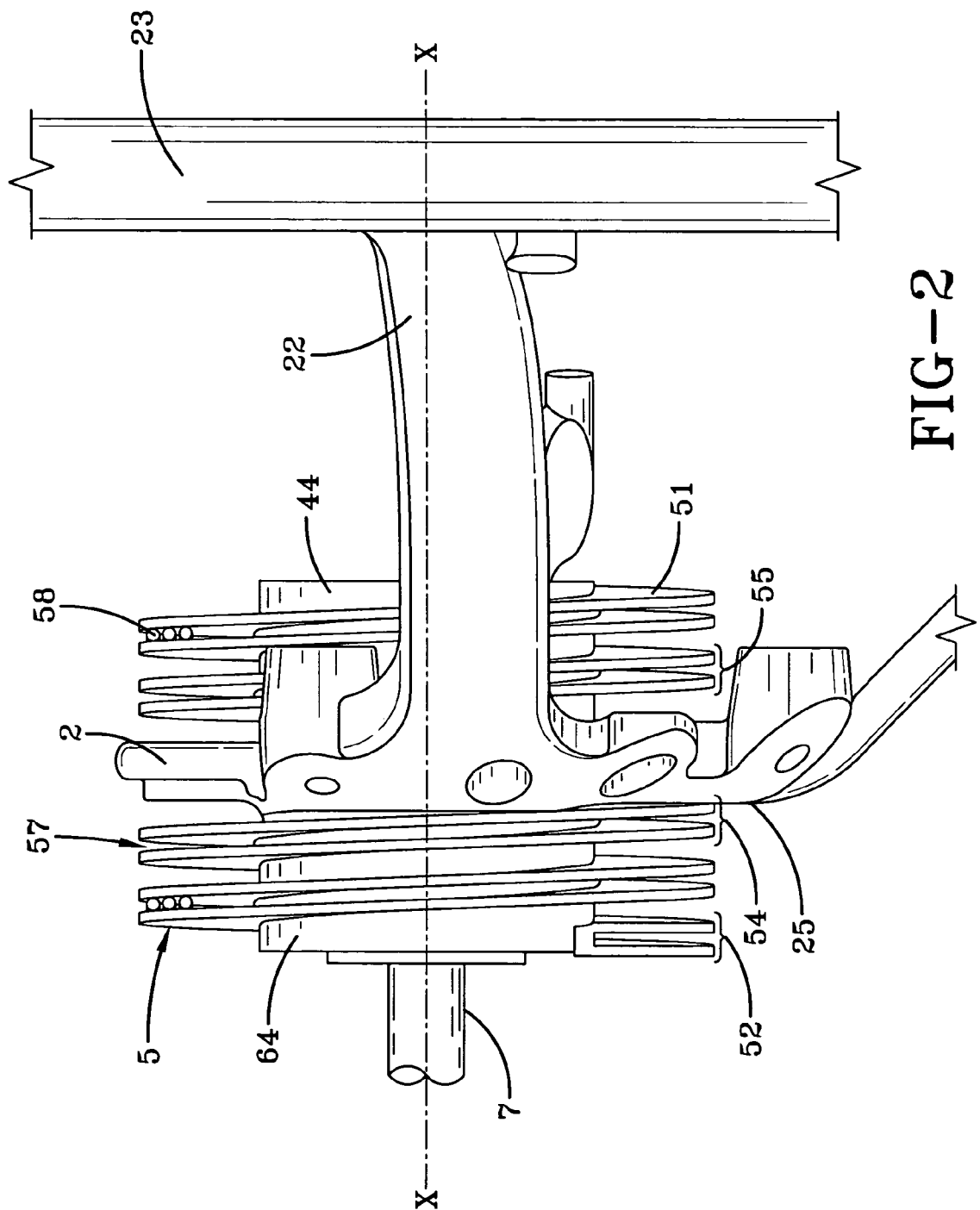
FIG. 2 is a side view of the steering wheel shown in FIG. 1, in a partially assembled configuration.

As shown in FIG. 2, during the assembly of the steering wheel the coiled element 5 is at least partially placed around the steering shaft 7. The coiled element 5 is intended to retain against rotation a non-rotating housing 41 mounted on the hub 2. One end 51 (FIG. 5) of the coiled element 5 is fixed to the non-rotating housing 41 arranged on the side 24 of the hub 2 that will be proximal to a vehicle driver and a second end 52 of the coiled element is fixed to a non-moving stationary component of a vehicle, for instance a frame portion of the vehicle instrument panel. The coiled element 5 is rigid against torsion. Thus the coiled element 5 is restrained against rotation around its longitudinal axis and consequently also the non-rotating housing 41 is prevented from rotating when the steering wheel is rotated.

With reference to the FIGS. 1-2 and 4-5, when the vehicle driver rotates the steering wheel, the coiled element 5 moves along a curved path into or away from the hub 2, i.e. the opening 3 runs along the coils 53-56 and more coils will be positioned either on a side 24 of the hub 2 that will be proximal to a vehicle driver or, vice versa, on an opposite side 25 of the hub 2 that will be distal from a vehicle driver, i.e. the side proximal a vehicle steering column. When the steering wheel is rotated the coils pass through the opening 3 in the hub 2 along a curved path defined by the coils. The hub 2 does not move longitudinally along the axis of rotation X-X, i.e. it is coupled to the steering shaft 7 in such a way that the hub rotates around the axis of rotation X-X but is not relocated along the length of the same axis. Consequently screwing and unscrewing of the coiled element 5 through the hub 2 requires the coils to axially move forward and back respectively. In other words, when the coiled element 5 screws through the hub 2, the coils near the first end 51 are relocated along the axis of rotation X-X toward the driver, i.e. some coils may pass through the hub opening 3 from the side 25 of the hub 2 that will be distal from a vehicle driver, i.e. the side proximal a vehicle steering column to the side 24 of the hub 2 that will be proximal with a vehicle driver. On the contrary, when the coiled element 5 unscrews from the hub 2, the coils near the second end 52 of the coiled element are relocated along the axis of rotation X-X toward the steering shaft, i.e. some coils may pass through the hub opening 3 from the side 24 of the hub 2 that will be proximal with a vehicle driver to the opposite side 25 of the hub.

Axial movement of the coils 53-56 may be provided in different ways. The coiled element 5 may be partially compressible along its longitudinal axis, i.e. the coils may be separated in their initial position and may abut one another when the coiled element is compressed. For instance, the coiled element 5 may be rigid and the first end 51 and second end 52 are coupled to support elements that are at least in part extensible and compressible along the axis of rotation X-X but are impeded from rotation around the same axis. If the coiled element is rigid the pitch between the coils is constant and sufficient to accommodate the hub between the two adjacent coils and means are provided for allowing axial movements of the same coiled element when the hub is moving on the coils. Such means allow the coiled element to move axially to screw and unscrew into and away from the hub which is itself axially fixed. For instance the ends of the coiled element may slide within axial slots provided in the non-rotating housing and in the stationary component of the vehicle and bearings may be provided to facilitate its sliding. Such means may be complicated to design and manufacture.

Alternatively the ends 51, 52 of the coiled element may be coupled in a sliding manner to axial slots provided in the non-rotating housing or in the stationary component of the vehicle. This arrangement would complicate the designing of the steering wheel, and an axially deformable coiled element 5 is preferred. Consequently the pitch between the coils of the coiled element, i.e. the distance between corresponding portions of adjacent coils, may be constant or may vary for the coils which are displaced axially by external forces.

Figure 5:
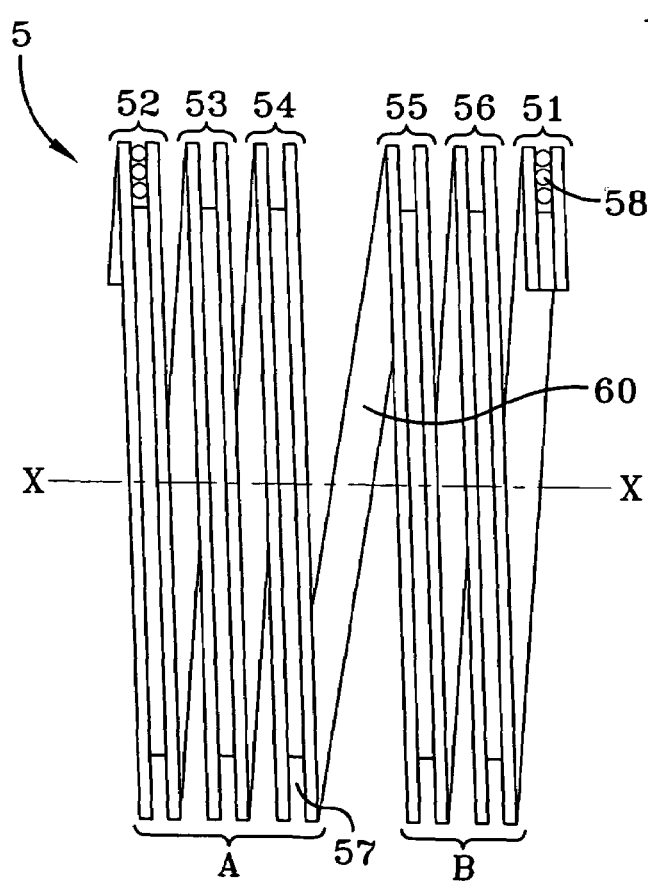
FIG. 5 is a side view of the component shown in FIG. 4.

Preferably the coiled element 5 is deformable, i.e. extensible, and the pitch between two adjacent coils will thus adapt to accommodate the hub, i.e. when the hub is interposed between two adjacent coils, the same coils are axially displaced by the hub from an initial relative position to an extended position, and when the hub proceeds along the coiled element the coils return to their initial relative position. Preferably the coiled element 5 is made of a material that allows the extension and compression of the coiled element along the axis of rotation X-X, for instance a plastic material, being at the same time rigid against torsion around axis of rotation X-X. Axial movement of the coils may be obtained by displacing some coils 53-56 and compressing other coils when the ends 51, 52 of the coiled element are firmly secured. FIG. 5 shows the coiled element 5 wherein the pitch between the coils 53, 56 nearest to the first end 51 and the second end 52 is substantially constant. The pitch between the coils 54, 55 is greater than the one between the remaining coils, i.e. a portion A of the coiled element 5 is axially displaced from another portion B of the coiled element. This is achieved by stretching a length 60 of the coiled element 5, i.e. by extending a portion of a coil along the axis of rotation X-X, by virtue of the hub 2 being positioned between adjacent coils 54, 55. Thus if the coiled element is extensible, its ends are axially fixed and the single coils may be axially compressed or extended to allow screwing and unscrewing into/from the hub which is itself fixed in the axial direction defined by the steering shaft.

FIG. 2 shows the steering wheel of the invention wherein the hub 2 is positioned between the coils 54, 55 illustrated in FIG. 5. The number of coils may be such that when the steering wheel is in its neutral position, thus guiding the vehicle in a straight direction, half of the coiled element 5 is positioned on the side 24 of the hub 2 that will be proximal with a vehicle driver and half is positioned on the opposite side 25 of the hub facing the instrument panel or the steering column. In the embodiment shown in the figures, the coiled element 5 comprises five coils.

When the hub 2 rotates the coils 53-56 move through opening 3 in the hub 2. The pitch between two consecutive coils sandwiching the hub 2 may increase to accommodate the hub 2. Further rotation of the hub 2 leads to a repositioning of the hub 2 between different coils, i.e. the coils initially sandwiching the hub return to their initial axial extension or pitch.

In order to minimize the axial extension of the coiled element 5, the coils nearest to the ends 51, 52 of the coiled element 5 may be axially compressed and contained at least partially in suitable housings, i.e. the coils may be pushed to abut one the other, thus limiting axial extension.

Advantageously, the coiled element may be used as a conveyor for the electrical wires or harnesses instead of expensive standard clock-spring connectors. The coiled element 5 may be provided with a slot 57 running continuously along the coils from the first end 51 to the second end 52 of the coiled member. As best shown in FIGS. 2 and 5, the slot 57 is arranged within the coils, i.e. the coiled member has a U shaped cross section defining the slot 57. The slot 57 conveys wires 58 or other conductors of electric current or signals to devices installed on the non-rotating housing 41. In this way the coiled element 5 is used to convey conductors of electric current or signals or wiring harnesses 58 to the non-rotating housing 41 through the hub 2 with no need for an expensive and complicated traditional clock-spring connection. The two housings 41, 61 have openings 75, 68 therein to facilitate passage of the conductors 58 of electric current or signals into and out of the housings.

The non-rotating housing 41 may be a support for devices such as LCD displays, radio controls or an airbag module 30. The non-rotating housing 41 may itself house an airbag module 30 adapted to be fixed to the end 51 of the coiled element 5.

Figure 3A:
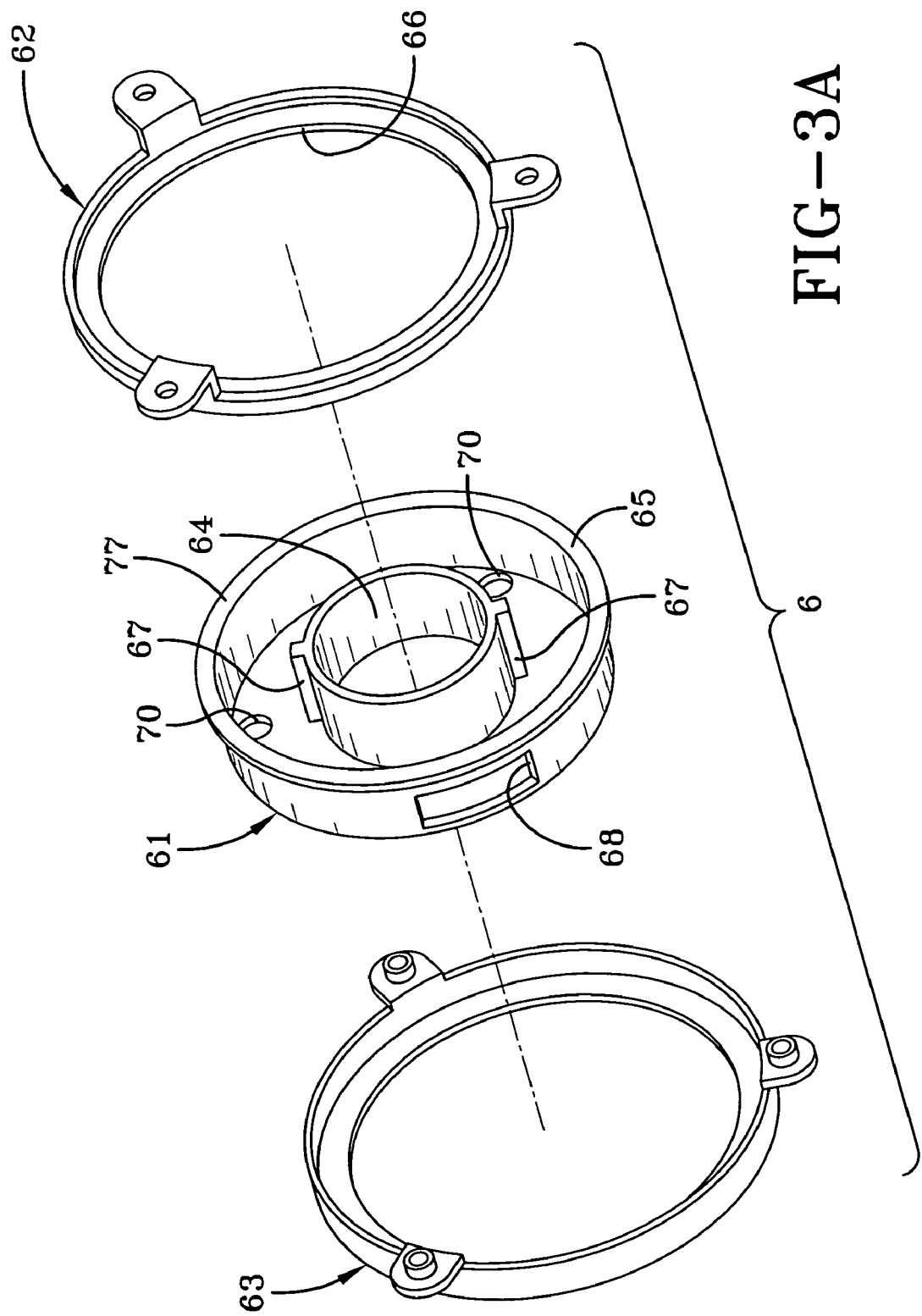
FIG. 3A is an exploded view of a first portion of the steering wheel shown in FIG. 1.
Figure 3B:
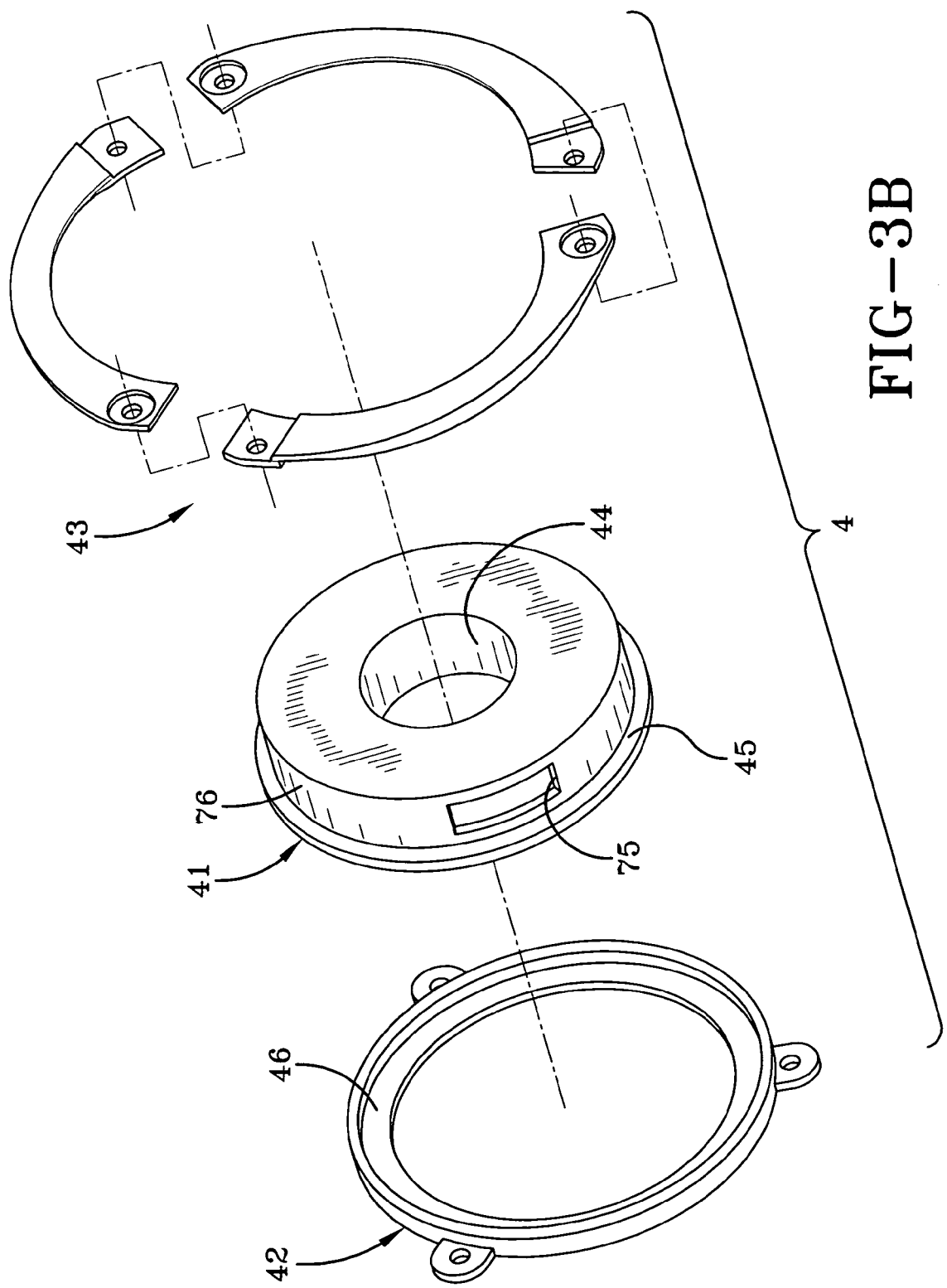
FIG. 3B is an exploded view of a second portion of the steering wheel shown in FIG. 1.

Preferably, as shown in FIGS. 1 and 3B, the non-rotating housing assembly 4 comprises a non-rotating housing 41 intended to contain the coils 51, 56 that will remain on the side 24 of the hub 2 that will be proximal with a vehicle driver. The non-rotating housing 41 is substantially the same as the second housing 61 of FIGS. 1 and 3A. The exterior of the housings 41, 61 is best shown in FIG. 3B and the interior of the housings is best shown in FIG. 3A. The only significant difference between the two housings is that the non-rotating housing 41 does not need to have mounting holes 70, as used in the second housing 61 to attach the second housing to a fixed, non-moving stationary component of the vehicle. Each of the housings 41, 61 has a substantially cylindrical shape has an outer circumferentially extending wall 76, 77 and an inner sleeve 44, 64 what cooperate to define a circumferentially extending space for receiving a portion of the coiled element. As the steering wheel is assembled, a portion of the coiled element 5 is place around the sleeves 44, eventually abutting on the same. The sleeves 44, 64 may be made of, or covered with, a material having a low coefficient of friction to allow an easy sliding of the coils along the sleeves longitudinally with respect to the axis of rotation X-X of the steering wheel. The non-rotating housing 41 is firmly coupled to the first end of the coiled element 5. On the central sleeve 44, 64, which have the same function in both housings 41', 61 are two projections 67 that are complementary with and mated to the notches 59 in the coils to avoid rotation of the coiled element 5 and thus avoid rotation of the non-rotating housing 41. If the coiled element 5 is extensible, its total length is limited by the dimensions of the non-rotating housing and the second housing, i.e. the ends are fixed while the pitch between some coils may vary at the time when the hub is located between such coils.

The non-rotating housing 41 is sandwiched between two coupled rings 42, 43. The first ring 42 is coupled to the armature 1, for instance to the hub 2 and rotates with the same. The ring 42 is provided with a ledge 46 on which a corresponding flange 45 of the non-rotating housing 41 slides when relative rotation occurs between the non-rotating housing 41, retained by the coiled element 5 against rotation, and the ring 42 jointly rotating with hub 2. The second ring 43 retains the non-rotating housing 41 on the ring 42. Screws or equivalent means may be utilized for coupling the rings 42, 43 and to the hub 2. Put another way, the two rings 42, 43 cooperate to provide a raceway or track that accommodates the circumferential flange 45 of the non-rotating housing 41, and while the rings rotate with the steering wheel the flange 45 simply slides in the track without rotating while the rotating rings secure the non-rotating housing to the steering wheel. It is evident that the non-rotating housing 41 only slides on the rotating ring 42, i.e. on the hub 2, but movements along axis of rotation X-X are inhibited as well as rotations around the axis of rotation X-X.

Figure 4:
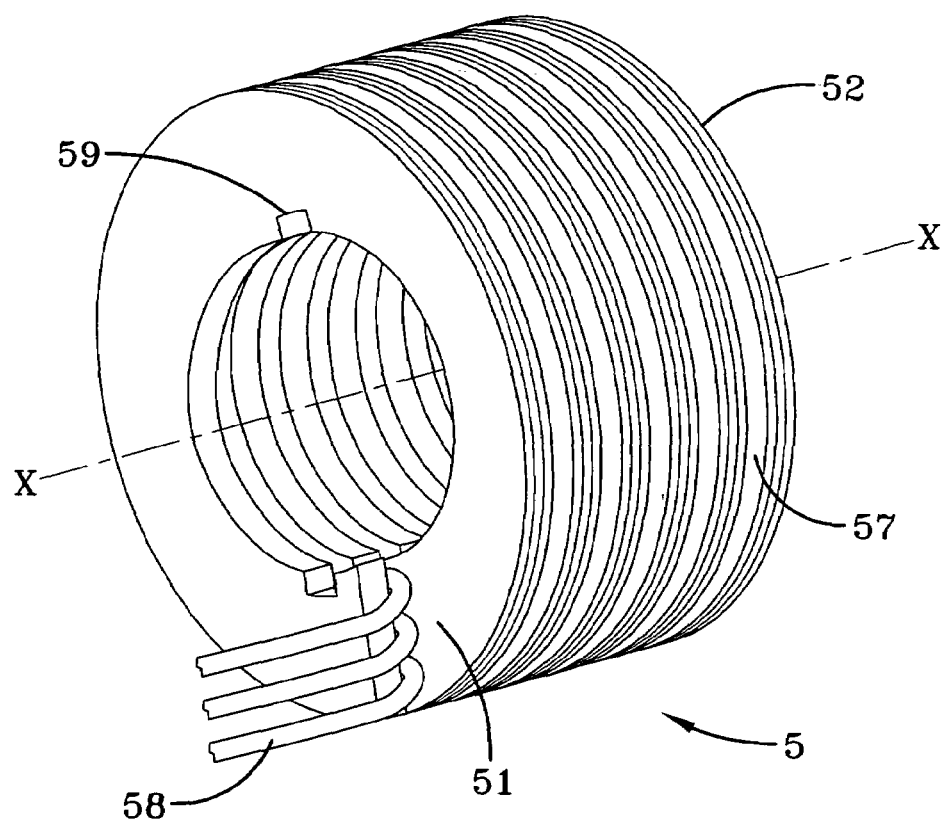
FIG. 4 is a perspective view of a component of the steering wheel shown in FIG. 1.

As shown in FIGS. 1 and 4, the coils of the coiled element 5 are provided with notches 59 intended to engage corresponding projections 67 provided on the sleeves 44, 64 to impede rotation of the coiled element 5.

Preferably, the non-rotating housing 41 serves as a support for a static, driver airbag module 30 that does not rotate with the steering wheel.

The second end 52 of the coiled element is firmly coupled to a second housing 61 similar to the non-rotating housing 41. FIG. 3A shows the second housing 61 and mounting respective rings 62, 63. Coils 52, 53 remaining on the side 25 of the hub 2 that will be distal from a vehicle driver are contained within the second housing 61.

The ring 62 is secured to the hub 2, on the side 25 of the hub 2 that will be distal from a vehicle driver, thus jointly rotating with the hub. The ring 62 is provided with a ledge 66 on which the corresponding flange 65 of the housing 61 slides when the ring 62 and the hub 2 rotate. Another ring 63 is coupled to the ring 62 to sandwich the second housing 61. In this embodiment the second housing 61 and the mounting rings 62, 63 interact in the same way as described above so that the mounting rings rotate with the steering wheel hub 2 but the second housing 61 does not rotate.

The second housing 61 is secured to a stationary component of the vehicle, for instance a frame component of the vehicle, by fastening means such as screws, nuts, bolts, etc. extending through mounting holes 70 in the second housing. By virtue of this coupling the coiled element 5 and the non-rotating housing 41 are impeded from rotating.

The non-rotating housing 41 and the second housing 61 act as compensators that exchange the coils 53 of the coiled element 5 axially moved by the hub 2 rotating clockwise or counter clockwise.

The steering wheel of the present invention has various advantages over prior art steering wheels provided with stationary hub portions. The steering wheel of the present invention allows stationary mounting of a driver airbag module and is cheap and easy to manufacture and assemble. The coiled element and the housings may be pre-assembled on a steering wheel armature that is directly connectable to a steering wheel shaft in a traditional way. The number of components or elements is minimized. Moreover the coiled element 5 and the associated housings 41, 61 may be made of a plastic elastomeric material. Consequently the steering wheel is cheap with respect to known solutions providing gears, duplication of the steering shaft, drive-by-wire, etc.

The steering wheel is easy to assemble as shown in FIG. 2 (wherein the outer circumferential wall 76, 77 of the housings 41, 61 are not shown to allow viewing of the relationship of the coiled element 5 to the walls of the sleeves 44, 64). It is sufficient to pass the coiled element 5 through the opening 3 in the steering wheel hub 2, couple the ends 51, 52 of the coiled member 5 to the respective housings 41, 61 and finally couple the housings 41, 61 to the hub 2 using the mounting rings 42-43 and 62-63.

Final assembly of the steering wheel with the vehicle involves the direct connection of the hub 2 to the steering wheel shaft 7, with no duplication of the same shaft or with no need for gears or other expensive devices. Safety of the connection is thus guaranteed.

Dimensions of the coiled element 5 and its housings 41, 61 may be easily adapted to be fitted in most common armatures, with evident advantages in minimizing production costs and in providing customized aesthetic solutions.

In summary, the coiled element 5 is extensible and provides a first end coupled to a non-rotating housing 41 located on the driver side of the hub 2. Rotation of the coiled element 5 is prevented by coupling it to the stationary component of the vehicle. Thus also the rotation of the non-rotating housing is impeded. When the hub 2 rotates the non-rotating housing 5 will slide on the hub; coupling between the hub and the non-rotating housing may be such that the hub is supported in a sliding manner and any axial movement is avoided, i.e. the hub may retain and support the non-rotating housing in the axial direction.

It is understood that the invention is not limited to the particular construction and arrangement of parts herein illustrated and described, but embraces all such modified forms thereof as come within the scope of the following claims.

The invention claimed is:

1. A steering wheel comprising an armature having a hub that is coupled to a vehicle steering shaft, the hub being provided with an opening, and non-rotating housing assembled with the hub on a side of the hub that will be proximal with a vehicle driver, and a coiled element that is a cylindrical helix arranged coaxially with the steering wheel shaft and extends through the opening in the hub to couple the non-rotating housing to a stationary component of the vehicle, the coiled element spiralling through the hub opening when the steering wheel is rotated, the non-rotating housing supporting an airbag module, and further comprising conductors for power or signals and wherein the coiled element is provided with a slot that conveys the conductors through the opening in the hub.

2. The steering wheel according to claim 1, wherein at least part of the coiled element is located around the steering wheel shaft.

3. The steering wheel according to claim 1, wherein the coiled element is elastically extendible along an axis of rotation of the steering wheel.

4. The steering wheel according to claim 1, wherein the pitch between the coils of the coiled element is constant and the hub is interposed between adjacent coils of the coiled element.

5. The steering wheel according to claim 2, wherein the pitch between the coils of the coiled element is constant and the hub is interposed between adjacent coils of the coiled element.

6. The steering wheel according to claim 1, wherein the pitch between adjacent coils adapts to accommodate the hub between the same adjacent coils.

7. The steering wheel according to claim 2, wherein the pitch between adjacent coils adapts to accommodate the hub between the same adjacent coils.

8. The steering wheel according to claim 1, wherein substantially the same number of coils of the coiled element are located on opposite sides of the hub when the steering wheel is in a neutral position.

9. The steering wheel according to claim 1, wherein a first end of the coiled element is coupled to the non-rotating housing located on the side of the hub that will be proximal to a vehicle driver.

10. The steering wheel according to claim 1, wherein at least a portion of the non-rotating housing can slide on the hub when the steering wheel rotates.

11. The steering wheel according to claim 1, wherein a second end of the coiled element, opposite to the first end with respect to the hub, is coupled to the stationary component of the vehicle.

12. The steering wheel according to claim 1, wherein the stationary component of the vehicle comprises a second housing to contain at least a portion of the coiled element.

13. The steering wheel according to claim 12, wherein at least a portion of stationary component of the vehicle slides on the hub, but does not rotate with the hub, when the steering wheel rotates.

14. The steering wheel according to claim 12, wherein the total length of the coiled element is limited by the non-rotating housing and the second housing and is prevented from rotating.

15. A steering wheel comprising an armature having a hub that is coupled to a vehicle steering shaft, the hub being provided with an opening, a non-rotating housing assembled with the hub on a side of the hub that will be proximal with a vehicle driver, and a coiled element that extends through the opening in the hub to couple the non-rotating housing to a stationary component of the vehicle, the coiled element spiralling through the hub opening when the steering wheel is rotated, and further comprising conductors for power or signals and the coiled element is provided with a slot that conveys the conductors through the opening in the hub.

16. The steering wheel according to claim 1, wherein the slot extends along the coils of the coiled element.

17. A steering wheel comprising an armature having a hub that is coupled to a vehicle steering shaft, the hub being provided with an opening, and non-rotating housing assembled with the hub on a side of the hub that will be proximal with a vehicle driver, the non-rotating housing supporting an airbag module such that the airbag does not rotate when the steering wheel is rotated, and a coiled element in the form of a cylindrical helix that extends through the opening in the hub to couple the non-rotating housing to a stationary component of the vehicle, the coiled element spiralling through the hub opening when the steering wheel is rotated, at least part of the coiled element being located around the steering wheel shaft with the coiled element elastically extendible along an axis of rotation of the steering wheel, the hub being interposed between adjacent coils of the coiled element and the pitch between adjacent coils adapts to accommodate the hub.

18. A steering wheel comprising an armature having a hub that is coupled to a vehicle steering shaft, the hub being provided with an opening, and non-rotating housing assembled with the hub on a side of the hub that will be proximal with a vehicle driver, and a coiled element that extends through the opening in the hub with one end of the coiled element coupled to a stationary component of the vehicle and another end of the coiled element is coupled to the non-rotating housing, the coiled element spiralling through the hub opening when the steering wheel is rotated, the non-rotating housing supporting an airbag module such that the airbag does not rotate when the steering wheel is rotated.

19. The steering wheel according to claim 18 further comprising conductors for power or signals and wherein the coiled element is provided with a slot that conveys the conductors through the opening in the hub.

20. The steering wheel according to claim 19, wherein the slot extends along the coils of the coiled element.

* * * * *